(12) United States Patent
Jan Kuiper et al.

(10) Patent No.: US 12,371,898 B2
(45) Date of Patent: Jul. 29, 2025

(54) BARRIER, CONSTRUCTION ARTICLE AND METHOD OF MANUFACTURE THEREOF

(71) Applicant: KINGSPAN HOLDINGS (IRL) LIMITED, Cavan (IE)

(72) Inventors: Gerrit Jan Kuiper, Gemert (NL); Marco Van Haandel, Gemert (NL)

(73) Assignee: KINGSPAN HOLDINGS (IRL) LIMITED, County Cavan (IE)

( * ) Notice: Subject to any disclaimer, the term of this patent is extended or adjusted under 35 U.S.C. 154(b) by 294 days.

(21) Appl. No.: 17/612,796

(22) PCT Filed: May 21, 2019

(86) PCT No.: PCT/EP2019/063151
§ 371 (c)(1),
(2) Date: Nov. 19, 2021

(87) PCT Pub. No.: WO2020/233806
PCT Pub. Date: Nov. 26, 2020

(65) Prior Publication Data
US 2022/0243462 A1  Aug. 4, 2022

(51) Int. Cl.
*E04B 1/94* (2006.01)
*B32B 5/02* (2006.01)
(Continued)

(52) U.S. Cl.
CPC .............. *E04B 1/942* (2013.01); *C04B 28/34* (2013.01); *B32B 5/028* (2013.01); *B32B 5/18* (2013.01);
(Continued)

(58) Field of Classification Search
CPC . E04B 1/942; E04B 1/94; C04B 28/34; C04B 2111/00482; C04B 2111/00612; C04B 30/02; B32B 5/028; B32B 5/18; B32B 19/047; B32B 19/048; B32B 21/02; B32B 2250/04; B32B 2255/04; B32B 2255/20; B32B 2307/3065; B32B 2419/00; B32B 5/24; B32B 17/02; B32B 2260/021; B32B 2260/046; B32B 2266/025; B32B 2266/0278; B32B 2266/0285;
(Continued)

(56) References Cited

U.S. PATENT DOCUMENTS 6,783,799 B1 * 8/2004 Goodson ............... C04B 41/009
427/403
2004/0194657 A1  10/2004 Lally
(Continued)

FOREIGN PATENT DOCUMENTS

EP  0832735 A2 * 9/1997 ............... B32B 5/18
EP  0808956 A2  11/1997
(Continued)

OTHER PUBLICATIONS

International Search Report dated Sep. 9, 2019 in corresponding PCT Application No. PCT/EP2019/063151.

*Primary Examiner* — Omar F Hijaz
(74) *Attorney, Agent, or Firm* — Harness, Dickey & Pierce, P.L.C.

(57) ABSTRACT

A barrier and method of manufacture thereof is provided. The barrier is suitable for enhancing the reaction to fire of structural elements such as construction boards.

15 Claims, 7 Drawing Sheets

(51) Int. Cl.
*B32B 5/18* (2006.01)
*B32B 19/04* (2006.01)
*B32B 21/02* (2006.01)
*C04B 28/34* (2006.01)
*C04B 111/00* (2006.01)

(52) U.S. Cl.
CPC ........... *B32B 19/047* (2013.01); *B32B 19/048* (2013.01); *B32B 21/02* (2013.01); *B32B 2250/04* (2013.01); *B32B 2255/04* (2013.01); *B32B 2255/20* (2013.01); *B32B 2307/3065* (2013.01); *B32B 2419/00* (2013.01); *C04B 2111/00482* (2013.01); *C04B 2111/00612* (2013.01)

(58) Field of Classification Search
CPC ..... B32B 13/14; B32B 21/10; B32B 2307/54; B32B 2262/101; B32B 2266/0228; B32B 2307/718; B32B 2307/732; B32B 2607/00; B32B 5/245; C09D 5/18; C09K 21/04
See application file for complete search history.

(56) References Cited

U.S. PATENT DOCUMENTS

| | | | |
|---|---|---|---|
| 2005/0229809 A1* | 10/2005 | Lally | C09D 5/18 |
| | | | 106/18.14 |
| 2008/0063875 A1 | 3/2008 | Robinson et al. | |
| 2010/0273376 A1* | 10/2010 | Jaffee | B32B 21/10 |
| | | | 156/181 |
| 2011/0254190 A1* | 10/2011 | Wagh | B27K 3/32 |
| | | | 162/159 |
| 2013/0298991 A1* | 11/2013 | Parker | C04B 18/021 |
| | | | 136/259 |
| 2015/0376418 A1* | 12/2015 | Patel | C04B 24/42 |
| | | | 106/14.44 |

FOREIGN PATENT DOCUMENTS

| | | | | |
|---|---|---|---|---|
| EP | 3199502 A1 | 8/2017 | | |
| WO | WO-2004101699 A1 * | 11/2004 | ............ | B32B 13/04 |
| WO | WO-2009143001 A2 * | 11/2009 | ......... | C08G 18/3206 |

\* cited by examiner

BARRIER, CONSTRUCTION ARTICLE AND METHOD OF MANUFACTURE THEREOF

CROSS-REFERENCE TO RELATED APPLICATIONS

This application is a 371 U.S. National Stage of International Application No. PCT/EP2019/063151, filed on May 21, 2019. The entire disclosure of the above application is incorporated herein by reference.

FIELD

The present invention relates to a barrier for improving the fire retardancy of building materials, such as panels or boards, a construction article including the barrier and a building structure including the barrier or construction article are also provided.

BACKGROUND

Thermal insulation materials are employed to improve the thermal efficiency of buildings. There are many different commercially available products which may be employed to insulate homes including fibre thermal-insulating materials such as glass wool and rock wool, foamed plastic thermal insulating materials formed by foaming thermoset or thermoplastic resins, and vacuum insulation panels.

Thermoset and thermoplastic foams are particularly efficient thermal insulation products. They are formed from foamable compositions which comprise inter alia a polymeric resin and a blowing agent. The thermal efficiency of the foamed product is dependent on the nature of the resin employed, the type of blowing agent used and the method of manufacture. In order to increases the thermal efficiency of an insulation product typically blowing agents having low thermal conductivity are employed to blow closed cell foams. During the formation of closed cell thermal insulating foams, blowing agent is volatised within a polymer resin and expands forming bubbles comprising the low thermal conductivity blowing agent which is held within a matrix of the polymer resin once the reaction is complete and the foam is formed.

One method for increasing thermal insulation performance within a building is to employ thicker insulation materials, however, this method is not always suitable, as the demand for space is also increasing, and loss of interior living space in residential buildings should be avoided. Thicker insulation materials are also undesirable around openings such as doors and windows if such materials will restrict the size of the openings.

As thermal insulation products are employed to line the walls and rooves of buildings, and also in façades which clad the exterior of buildings, the fire retardancy of such products is also important.

Several approaches have been adopted to improve the fire retardancy of thermal insulation products, such as foam boards. One method is to try to decrease the flammability of the foam by incorporating fire retardant additives into the compositions used to form the foams. For example, the incorporation of halogenated compounds into foamable compositions has been used to improve the fire retardancy of the foamed products.

U.S. Pat. No. 4,057,531 describes the incorporation of tetrabromoxylene-α,α'-diols into expandable styrene compositions to render them fire retardant.

Hexabromocyclododecane (HBCD) is a brominated flame retardant which was used for many years in extruded polystyrene and expanded polystyrene, however, concerns over the long term impact of HBCD on the environment have led to a significant reduction in its use, and its use in extruded and expanded polystyrene was phased out in Europe in August of 2015, following regulatory restrictions which were initiated by the European Union's Registration, Evaluation, Authorization and Restriction of Chemicals (REACH) substances program.

In 2011 Dow Global Technologies LLC (DGTL) announced the creation of a new high molecular weight brominated polymeric flame retardant, designed as a sustainable replacement for HBCD. The brominated polymeric flame retardant, is a butadiene styrene brominated copolymer. European Patent No. 1 957 544 describes such brominated copolymers and foamed polystyrene articles comprising same.

Another method for reducing the flammability of closed cell thermal insulation foam products such as such as polyisocyanurate, polyurethane or phenolic foam products, is to employ blowing agents having low flammability. While chlorofluorocarbons and hydrochlorofluorocarbons have low flammability, their use has also been phased out following the Montreal Protocol, because of the global warming potential and ozone depletion potential of such substances. Hydrocarbon blowing agents have reduced environmental impact, but the thermal insulation and fire performance of hydrocarbon blowing agents less favourable. Hydrofluoroolefin blowing agents have excellent flame retardancy and thermal insulation performance and their use as blowing agents in thermoset and thermoplastic insulation products is already prevalent.

A further method for improving the fire retardancy of an insulation product, such as a closed cell thermal insulating foam, is to apply fire retardant coatings or barriers to one or more external faces of the products. As the incorporation of additives such as flame retardants in a foamable composition may deleteriously impact other properties of the resulting foam product, for example, the thermal conductivity of the foam may be increased due to an increase in the open cell content of the foam, upon the incorporation of such an additive, accordingly, applying a fire retardant coating or substance to the external surface of a foam product is an alternative approach for improving fire performance of the product without negatively impacting other properties of the foam, such as its thermal insulation performance.

European Patent No. 2,152,789 describes polystyrene articles which are coated with a fire resistant binder and an intumescent. The fire-resistant binder is an inorganic material selected from metal silicates, metal aluminates, metal aluminosilicates and zeolites. The intumescent may be ammonium polyphosphate/pentaerythritol mixtures, melamine, guanidines, chloroparaffins, phosphines, phosphonates, resin binders and expandable graphite.

Thermoset foams such as phenolic foam, polyurethane foam and polyisocyanurate foam are often formed with facers thereon. The facers may for example be glass fibre facing materials. To improve the fire performance of such products, the facers may be impregnated with flame retardants.

The application of fire-retardant compositions on building materials or structural elements such as foam boards to form fire resistant barriers on the structural element is known, the fire performance of the resulting construction articles varies greatly. For example, when a fire-retardant composition is coated on a closed-cell foam board, the blowing agent which is entrapped in the cells of the foam, may rupture the cells of the foam as the heat of the fire causes the blowing agent to expand. The rupture of the cells may damage the fire-retardant composition coated on the foam, and if the blowing agent is flammable, once the cells rupture the blowing agent may be ignited if brought into contact with the flames, or if its flash point is exceeded.

Notwithstanding the state of the art it would be desirable to provide a barrier for enhancing the fire performance of structural elements, without negatively impacting other properties of the structural element.

SUMMARY

In one aspect, the present invention provides a barrier comprising a cured phosphate composition and a glass fibre scrim, wherein the glass fibre scrim is capable of reducing the pH of demineralised water having a pH of 7 to a pH 6.3 or lower, when assessed in accordance with ISO 3071:2005; said barrier having a thickness of at least 1 mm.

The cured phosphate composition may be formed from a curable composition comprising:
  a phosphate selected from the group consisting of: phosphoric acid, phosphoric acid salts and combinations thereof,
  a metal oxide, a metal silicate, and water,
  where the weight ratio between the phosphate and the metal oxide is between about 3:1 and 1:1.

Advantageously, the combination of a glass fibre scrim capable of reducing the pH of demineralised water having a pH of 7 to a pH 6.3 or lower, when assessed in accordance with ISO 3071:2005, with the cured phosphate composition provides an effective, light-weight, fire resistant barrier. This barrier may be used to improve the fire performance of substrates to which it is attached.

The phosphate may be present in an amount of from about 10 to about 45 weight percent based on the total weight of the curable composition.

The metal oxide may be present in an amount of from about 5 to about 35 weight percent based on the total weight of the curable composition.

The metal silicate may be present in an amount of from about 1 to 15 weight percent based on the total weight of the curable composition.

The phosphate is preferably mono-potassium phosphate.

The metal oxide may be magnesium and/or calcium oxide. Preferably, the metal oxide is magnesium oxide.

The curable composition may be a two-part (2K) composition.

The phosphate and the metal oxide may be in separate parts of the two-part composition. Advantageously, this increases the shelf-life of the curable composition, and consequently, less curable composition is required to form an effective fire-resistant barrier.

The curable composition may further comprise a silica containing compound.

The curable composition may further comprise an adhesion promoter, for example, the curable composition may comprise an alcohol such as ethanol, propanol, butanol or isomers thereof. The adhesion promoter may be isopropanol, ethanol, ether, sodium silicate, limonene, an acrylic-styrene based co-polymer or combinations thereof. Preferably, the adhesion promoter is an acrylic-styrene based co-polymer. Suitably, the adhesion promoter comprises an aqueous emulsion comprising an acrylic-styrene based copolymer.

Additionally or alternatively, a substrate to which the barrier will be attached may be pre-treated with an adhesion promoter, prior to application of the barrier to the substrate. The substrate is suitably a structural element.

Pre-treatment of the structural element with the adhesion promoter may be achieved by application of the adhesion promoter to a first surface of the structural element by pouring, rolling, or spraying the adhesion promoter on said first surface. Preferably, the adhesion promoter is sprayed on the first surface of the structural element.

Advantageously, the use of an adhesion promoter increases the strength of the attachment of the curable composition to a structural element to which it is applied.

When present in the curable composition, the adhesion promoter may be present in an amount of from about 0.01 to about 5 wt % based on the total weight of the curable composition. Suitably, the adhesion promoter is present in an amount of from about 0.1 to about 2 wt %, such as from about 0.5 to about 1.5 wt % based on the total weight of the curable composition.

When pre-treating a structural element, the adhesion promoter is preferably applied by spraying a first surface of the structural element with said adhesion promoter. The adhesion promoter may be applied at a surface area coverage of from about 75 $g/m^2$ to about 180 $g/m^2$, suitably, at a surface area coverage of from about 100 $g/m^2$ to 150 $g/m^2$.

The glass fibre scrim may have a tensile strength as determined in accordance with DIN EN ISO 13934-1 of at least about 500 N, suitably from about 500 N to about 1000 N in the longitudinal direction. This imparts significant strength to the barrier and indeed to a construction article comprising the barrier. When the glass fibre scrim has a tensile strength of less than 500 N, a barrier formed therewith will tend to bend more easily. Preferably, the glass fibre scrim is a glass fibre woven scrim.

The glass fibre scrim may have a mesh size in the range of from 0.5 mm×0.5 mm to 9 mm×9 mm, preferably the mesh size is of from 1 mm×1 mm to 5 mm×5 mm. If the mesh size is less than 0.5 mm×0.5 mm, penetration of the curable phosphate composition through the glass fibre scrim, and impregnation of the curable phosphate composition in the glass fibre scrim is reduced. The barrier has optimal fire retardancy when the mesh size is 0.5 mm×0.5 mm to 9 mm×9 mm. If the glass fibre scrim mesh size is too large i.e. greater than about 9 mm×9 mm, cracks can occur in the barrier during a fire, and an underlying structural element to which the barrier is attached will be exposed to the fire.

The glass fibre scrim may for example have a weight of from about 40 to about 400 $g/m^2$. Suitably, the glass fibre scrim has a weight of from about 50 $g/m^2$ to about 250 $g/m^2$, or from about 70 $g/m^2$ to about 220 $g/m^2$. Preferably the glass fibre scrim has a weight of from about 150 $g/m^2$ to 220 $g/m^2$. If the scrim is too heavy, for example a scrim having a weight of greater than 220 $g/m^2$, impregnating the scrim with the curable composition is more challenging. The barrier has optimal strength when the glass fibre scrim has a weight in the range of from about 150 $g/m^2$ to 220 $g/m^2$, such as from 150 $g/m^2$ to 200 $g/m^2$.

Advantageously, the glass fibre scrim employed in the present invention is sufficiently hydrophilic to be impregnated by a curable phosphate composition.

The barrier may have a thickness of from about 1 mm to about 10 mm, preferably about 1.5 mm to about 5 mm, such as from about 2 mm to about 4 mm.

Suitably the barrier may have a thickness of about 1 mm and a weight of about 1.3 to about 1.5 $kg/m^2$.

The present invention also provides a construction article comprising a structural element having a barrier as described herein applied thereto. The curable phosphate composition adheres the barrier to the structural element during curing of the curable phosphate composition.

The structural element may be a construction board. For example the structural element may comprise wood, fibreboard, particleboard, medium density fibreboard (MDF), oriented strand board (OSB), gypsum, a vacuum insulation panel and/or foam. Suitably, the structural element is a thermoset or thermoplastic foam. The structural element may be a composite panel comprising two or more (which may be the same or different) of wood, fibreboard, particleboard, medium density fibreboard (MDF), oriented strand board (OSB), gypsum, a vacuum insulation panel and/or foam. For example, the structural element may comprise a composite panel comprising two or more foams, such as two or more foam boards. Each of the foam boards may be of the same type, e.g. both polystyrene, or they may be different types, e.g. a structural element comprising a composite panel formed from a phenolic foam and a polystyrene foam board. The structural element may comprise a composite panel comprising a vacuum insulation panel encapsulated in a foam.

In one embodiment, the construction article is a construction board which is a thermoset foam selected from a phenolic foam, a polyurethane foam or a polyisocyanurate foam.

In another embodiment, the construction article is a construction board which is a thermoplastic foam selected from a polystyrene foam or a polyolefin foam. The polystyrene foam may be expanded polystyrene foam or extruded polystyrene foam.

In the construction article preferably the barrier is a barrier having a thickness of from 1 mm to 10 mm, such as from about 1.5 mm to about 5 mm, preferably from about 2 mm to about 4 mm.

Suitably, the construction article according to the invention has at least a B classification according to EN13501, preferably having an A2 or an A1 classification according to EN13501.

The construction article may for example be a roof element, a wall element or a floor element. Preferably, the construction article is a roof element.

In one embodiment, the construction article comprises an expanded polystyrene structural element and the barrier is formed from a curable composition comprising mono potassium phosphate, magnesium oxide, aluminium silicate, silica and isopropanol.

The present invention also provides for a building comprising a barrier of the present invention, or a construction article according to the present invention.

Also provided herein is a method for manufacturing a construction article comprising the following steps:
(i) providing a structural element;
(ii) providing a curable composition comprising a phosphate selected from the group consisting of: phosphoric acid, phosphoric acid salts and combinations thereof, a metal oxide, a metal silicate, and water, where the weight ratio between the phosphate and the metal oxide is between about 3:1 and 1:1;
(iii) providing a scrim capable of reducing the pH of demineralised water having a pH of 7 to a pH 6.3 or lower, when assessed in accordance with ISO 3071: 2005;
(iv) applying the curable composition and the glass fibre scrim on a first surface of the structural element, such that a coating comprising the glass fibre scrim embedded in the curable composition is formed on said first surface, and whereby the curable composition is impregnated in the glass fibre scrim;
(v) curing the curable composition, to form a barrier layer on the structural element.

The curable composition may be applied to the first surface of the structural element to provide a coating of curable composition on said first surface, and the glass fibre scrim may be subsequently pressed into the coating of curable composition to embed said scrim in said curable composition and to impregnate the curable composition in said scrim.

Alternatively, the curable composition may be applied to the glass fibre scrim and the resulting scrim and composition may be pressed onto a first surface of the structural element, to thereby form the coating comprising the glass fibre scrim embedded in the curable composition and to impregnate the curable composition in said scrim.

Suitably, the method may further comprise applying one or more layers of curable composition to the coating. The one or more layers of curable composition may be applied to the coating prior to curing.

One or more additional layers of curable composition may be applied to the barrier, and subsequently cured. In this way layers may be built up by applying and then curing a layer and then applying and curing a subsequent layer.

The method may include providing a curable phosphate composition further comprising an adhesion promoter, such as isopropanol, limonene, sodium silicate, an acrylic-styrene co-polymer or combinations thereof.

Additionally, or alternatively, the method may include pre-treatment of the structural element with an adhesion promoter, prior to applying the curable composition and the glass fibre scrim on a first surface of the structural element.

The adhesion promoter may comprise an acrylic-styrenic co-polymer, such as an acrylic-styrenic co-polymer derived from organic plant material.

The adhesion promoter may comprise an emulsion comprising an acrylic-styrenic co-polymer and water. Suitably, the acrylic-styrenic co-polymer is present in the emulsion in an amount of from about 8 wt % to about 14 wt % based on the total weight of the emulsion.

Suitably, the structural element may comprise a thermoset or thermoplastic foam.

The thermoset foam may be a phenolic foam, a polyurethane foam or a polyisocyanurate foam.

The thermoplastic foam may be a polystyrene or a polyolefin foam. The polystyrene may be expanded polystyrene or extruded polystyrene.

The glass fibre scrim may have a weight in the range of from 150 g/m$^2$ to 220 g/m$^2$.

As outlined above, the curable composition may comprise mono potassium phosphate in an amount of from about 24 to about 32 weight percent, magnesium oxide in an amount of from about 22 to 28 weight percent, aluminium silicate or calcium silicate in an amount of from about 2 to 5 weight percent, water in an amount of from about 20 to 40 weight percent, and isopropanol present in an amount of from about 0.01 to about 2 weight percent, based on the total weight of the curable composition.

Preferably, the method for manufacturing a construction article comprising the following steps:
(i) (a) providing a structural element;
(b) pre-treating a first surface of said structural element, with an adhesion promoter to provide pre-treated first surface of the structural element;

(ii) providing a curable composition comprising a phosphate selected from the group consisting of: phosphoric acid, phosphoric acid salts and combinations thereof, a metal oxide, a metal silicate, and water, where the weight ratio between the phosphate and the metal oxide is between about 3:1 and 1:1;
(iii) providing a scrim capable of reducing the pH of demineralised water having a pH of 7 to a pH 6.3 or lower, when assessed in accordance with ISO 3071: 2005;
(iv) applying the curable composition and the glass fibre scrim on the pre-treated first surface of the structural element, such that a coating comprising the glass fibre scrim embedded in the curable composition is formed on said first surface, and whereby the curable composition is impregnated in the glass fibre scrim;
(v) curing the curable composition, to form a barrier layer on the structural element.

Suitably, the adhesion promoter comprises an acrylic-styrene co-polymer. For example, the adhesion promoter may comprise an aqueous emulsion comprising an acrylic-styrene co-polymer. Suitably, the acrylic-styrene co-polymer is a plant extract.

In yet another aspect, the present invention provides for use of a scrim capable of reducing the pH of demineralised water, having a pH of 7, to a pH of 6.3 or lower, when assessed in accordance with ISO 3071:2005, for forming a barrier as described herein.

BRIEF DESCRIPTION OF THE DRAWINGS

Embodiments of the invention will be described, by way of example only, with reference to the accompanying drawings in which.

DEFINITIONS

Figure 1:
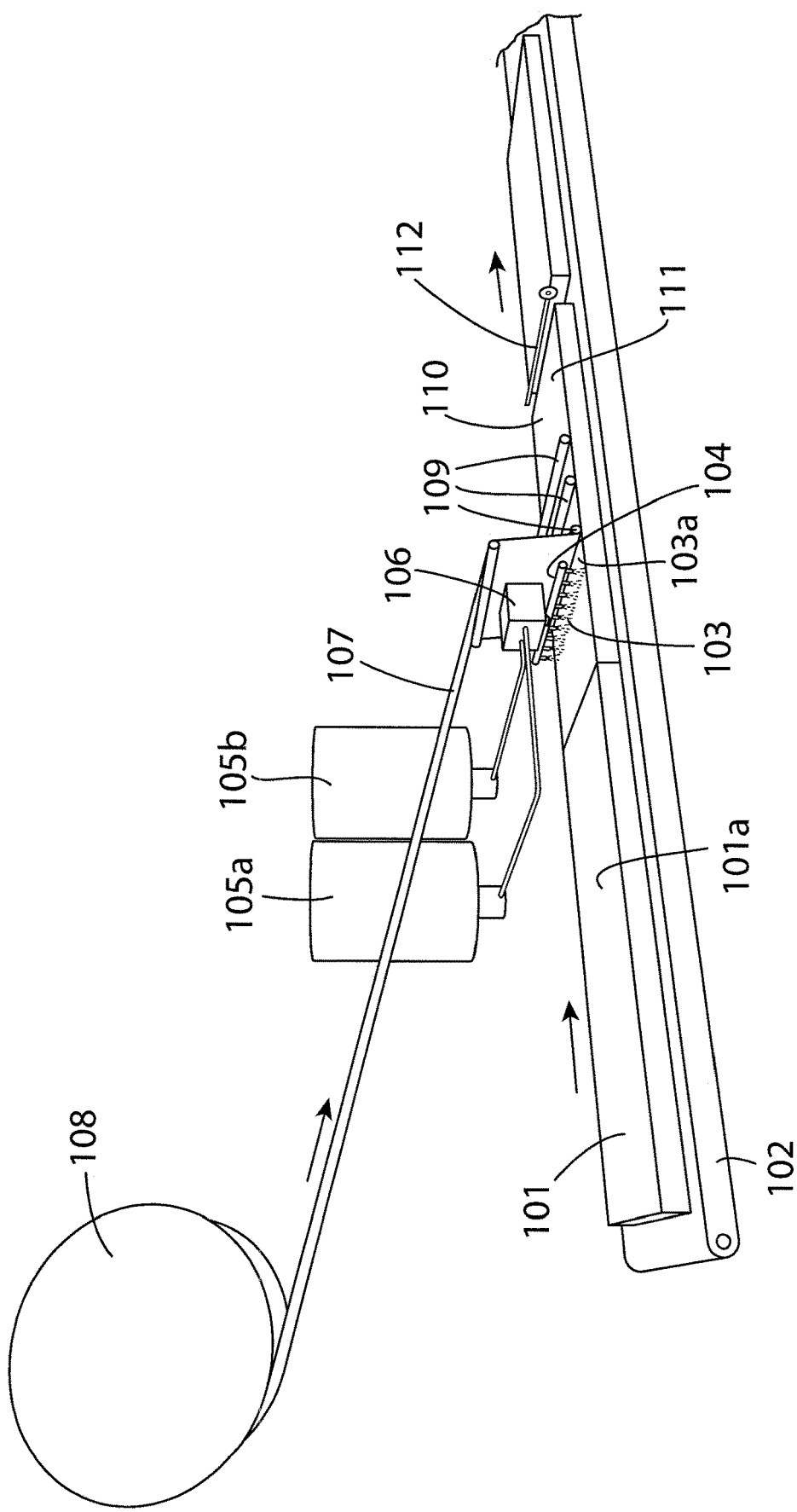
FIG. 1 shows the method of manufacture of a construction article comprising a barrier as described herein.

Barrier: the barrier of the present invention is a fire-resistant coating which may be applied to structural elements. The barrier improves the fire performance of a substrate (i.e. a structural element) to which it is applied.

Structural element: a structural element is a substrate to which the barrier of the present invention may be applied. The substrate may be a building material which may for example be used to form walls, roofs, floors or parts thereof, examples include boards or panels, the structural element need not be a load bearing element, for example an insulation panel could be a structural element as defined in the present invention. The structural element may be supported by a framework. A board such as an OSB, MDF or wooden board could be a structural element as defined in the present invention. A structural element may also be a wrapping member such as an insulation material for pipes or ducting, for example a foam pipe section, such as those described in WO2004053380 or WO2014044717. The structural element may be planar or curvilinear. Suitable examples of structural elements are provided below.

Construction article: the construction article of the present invention comprises the barrier of the present invention applied to a structural element. The barrier may be formed directly on the structural element to provide the construction article. The construction article may be used to replace conventional structural elements, such as roof elements, wall elements or floor elements. A conventional roof element for example may comprises an EPS foam board sandwiched between two particle boards, or an EPS foam board having a particle board reinforcing member on a major surface thereof. For example, a construction article comprising an EPS foam board having the barrier of the present invention applied thereto, may be used to replace an EPS foam board, or for example a composite foam board comprising EPS foam and particle board. In addition, a construction article of the present invention comprising an EPS foam board, having a particle board reinforcing member on a major surface thereof, said particle board having the barrier of the invention applied thereto, may be used to replace for example a composite foam board comprising EPS foam and particle board.

DETAILED DESCRIPTION

The use of fire-retardant coatings to improve the fire performance of structural elements such as foam boards is known. Furthermore, the use of fibres to reinforce such coatings is known. The present inventors have identified a unique barrier having excellent fire resistance properties which is formed by curing a fire resistant composition which is reinforced by a specific type of scrim. The barrier may be used to significantly enhance the fire performance of a structural element.

The curable composition comprises a phosphate selected from the group consisting of: phosphoric acid, phosphoric acid salts and combinations thereof, a metal oxide or hydroxide, a metal silicate, and water, where the weight ratio between the phosphate and the metal oxide is between about 3:1 and 1:1.

Preferably, the phosphate is a potassium phosphate, more preferably mono potassium phosphate (MKP). Other phosphates include but are not limited to phosphoric acid and phosphoric acid salts. Suitable phosphoric acid salts include but are not limited to: mono-ammonium phosphate, di-ammonium phosphate, aluminium phosphate, sodium phosphate, and combinations thereof. Suitably, the MKP has an average particle size of from about 20 to 100 μm.

The metal oxide or hydroxide may for example be the oxide or hydroxide of an alkali metal or an alkaline earth metal.

The metal oxide or hydroxide may be selected from magnesium oxide, magnesium hydroxide, calcium oxide, calcium hydroxide, calcium magnesium oxide, iron oxides, aluminium oxides, zinc oxides, aluminium hydroxides, zirconium oxides, zirconium hydroxides, calcium oxides, calcium hydroxides, aluminium oxides, and combinations thereof.

Preferably, the metal oxide is magnesium oxide (MgO). Suitably, the metal oxide such as MgO has an average particle size of from about 20 to 200 μm.

The metal silicate may be an alkali metal silicate, an alkaline earth metal silicate, aluminium silicate, calcium silicate, magnesium silicate, talc, or olivine, or combinations thereof. Suitably, the metal silicate is an aluminium silicate such as kaolinite or a calcium silicate.

The curable composition may further comprise fillers. Preferably, the filler comprises silica i.e. $SiO_2$ such as that which is commercially available under the tradename Microsil® M6. Preferably the filler such as silica has a particle size of from about 10 μm to 100 μm, such as from about 25 μm to 75 μm.

Suitably, the phosphate is present in an amount of from about 10 to about 45 weight percent based on the total weight of the curable composition. More suitably, the phosphate is present in an amount of from about 20 to about 35 weight percent based on the total weight of the curable composition, such as from about 24 to about 32 weight percent based on the total weight of the curable composition.

Preferably, the phosphate comprises mono potassium phosphate and is present in an amount of from about 24 to about 32 weight percent based on the total weight of the curable composition.

The metal oxide may be present in an amount of from about 5 to about 35 weight percent based on the total weight of the curable composition. More suitably, the metal oxide is present in an amount of from about 20 to 30 weight percent based on the total weight of the curable composition, such as from about 22 to about 28 weight percent based on the total weight of the curable composition.

Preferably, the metal oxide is magnesium oxide (MgO) and is present in an amount of from about 22 to about 28 weight percent based on the total weight of the curable composition.

The metal silicate may be present in an amount of from about 1 to about 15 weight percent based on the total weight of the curable composition. More suitably, the metal silicate is present in an amount of from about 1 to about 7 weight percent such as from about 2 to about 5 weight percent based on the total weight of the curable composition.

Preferably, the metal silicate is an aluminium or a calcium silicate and is present in an amount of from about 2 to about 5 weight percent based on the total weight of the curable composition.

Optionally, the curable composition may comprise a filler such as silica. The filler may be present in an amount of from about 5 to about 25 weight percent based on the total weight of the curable composition. Suitably, the filler may be present in an amount of from about 5 to about 15 weight percent, such as from about 7 to about 12 weight percent based on the total weight of the curable composition.

The curable composition may further comprise additives such as surfactants, stabilisers, cure accelerators, diluents, rheology modifiers etc.

The curable composition may comprise water which is present in an amount of from about 25 to about 45 weight percent, suitably the water is present in an amount of from about 30 to about 40 weight percent based on the total weight of the curable composition.

A preferred curable composition comprises:
mono potassium phosphate in an amount of from about 24 to about 32 weight percent,
magnesium oxide in an amount of from about 22 to 28 weight percent,
aluminium silicate or calcium silicate in an amount of from about 2 to 5 weight percent,
water in an amount of from about 20 to 40 weight percent, and
an isopropanol present in an amount of from about 0.01 to about 2 weight percent, based on the total weight of the curable composition.

The curable composition is employed in a sufficient quantity to ensure the barrier formed therewith has a thickness of at least 1 mm i.e. the barrier has a depth of at least 1 mm.

Preferably, the curable composition is a two-part (2K) composition, wherein the phosphate and the metal oxide are in separate parts of the two-part composition. Advantageously, this increases the shelf-life of the curable composition.

For example in a preferred 2K composition, one part of the curable composition may comprise a suspension of a phosphate, a metal silicate and a filler in water, and the second part of the curable composition may comprise a suspension of a metal oxide and a filler in water.

Suitably, the curable composition comprises an adhesion promoter. Without being bound by theory, an adhesion promoter may act for example by modifying the surface to which the composition is applied, chemically or physically. For example, an adhesion promoter may create deformations in the surface to which the curable composition is applied. The adhesion promoter may be an alcohol such as ethanol, propanol, butanol or isomers thereof. The adhesion promoter may comprise isopropanol, sodium silicate, ethanol, ether, limonene, or an acrylic-sytrene co-polymer. Advantageously, when an adhesion promoter is used in the curable composition, better adherence is achieved for the barrier to a structural element.

Suitably, an alcohol adhesion promoter may be employed in the curable composition, and an adhesion promoter comprising an acrylic-styrene co-polymer may be used to pre-treat a first surface of a structural element to which the barrier will be applied.

In preferred embodiments, an adhesion promoter comprising an emulsion comprising an acrylic-styrene co-polymer in water is employed to pre-treat a first surface of a structural element to which the barrier will be applied.

The curable composition may be cured by any suitable means, for example, cure may be effected by heating the curable composition. The curable composition may be cured by allowing the composition to stand at a temperature of from about 15° C. to about 30° C. The composition may cure in about 5 to 30 minutes. The curable composition may have a reactive cure and/or cure by drying.

Preferably, the composition is applied at a temperature of from about 20° C. to about 30° C., for example from about 24° C. to about 28° C.

The glass fibre scrim is acidic. The acidity may be derived from a coating on the fibres of the glass fibre scrim, from an adhesive bonding fibres such as an adhesive bonding horizontal and vertical threads formed by the fibres, or both. The glass fibre scrim must be capable of reducing the pH of demineralised water, having a pH of 7, to a pH of 6.3 or lower, when assessed in accordance with ISO 3071:2005. If the pH is higher than 6.3 the glass fibre scrim will not be impregnated by the curable composition, and a less effective fire-resistant barrier will result. In the barrier of the present invention, the glass fibre scrim is embedded in the cured phosphate composition, and the phosphate composition is impregnated into the glass fibre scrim.

Preferably, the glass fibre scrim is capable of reducing the pH of demineralised water, having a pH of 7, to a pH of 6 or lower, such as a pH of 5.8 or lower, or 5.6 or lower when assessed in accordance with ISO 3071:2005.

Suitably, the glass fibre scrim has a tensile strength of at least about 500 N, such as from about 500 N to about 1000 N in the longitudinal direction as determined in accordance with DIN EN ISO 13934-1. Preferably, the glass fibre scrim has a tensile strength of from about 600 N to about 800 N in the longitudinal direction as determined in accordance with DIN EN ISO 13934-1. When the glass fibre scrim has a tensile strength of from 500 N to 1000 N in the longitudinal direction, the barrier formed by curing the curable composition with the glass fibre scrim embedded therein, and having the curable composition impregnated in the glass fibre scrim, is greatly reinforced, and less prone to deformation. Furthermore, a construction article comprising a structural element such as a foam board having a barrier applied thereto, is significantly reinforced by the barrier. Thus for example prior art construction articles comprising a foam board having a reinforcing facing member such as particle board on one or both major surfaces, may be replaced with construction articles according to the present invention. For example a construction article according to the present invention comprising a foam board having the barrier of the invention applied thereto, or a construction article according to the present invention comprising a foam board having the barrier of the invention applied thereto on one major surface (e.g. an upper surface) of said foam board and said foam board having a single reinforcing facing member of for example particle board on the other major surface (e.g. the lower surface) of the foam board, or a construction article according to the present invention comprising a foam board having a reinforcing facing member of for example particle board on at least one major surface of said foam board, and a barrier according to the present invention applied to said particle board. Suitably, the construction article has a sandwich structure and the barrier of the present invention will be to the exterior of the construction article. The barrier imparts strength to the foam board equivalent to that provided by the reinforcing facing member employed in the prior art construction article. For example, a composite panel comprising an EPS board (80 mm thick, 2 m long, width w) and a particle board facer (3 mm thick, 2 m long, width w) having a given size, may be replaced with a construction article of the present invention comprising a corresponding EPS board (80 mm thick, 2 m long, width w) with the barrier of the invention applied thereto, whereby the barrier has a thickness of about 1.5 mm.

Tensile strength was measured according to the requirements of the EN ISO 13934-1 norm. A strip of 50 mm width and 200 mm length is stretched until rupture with a rate of extension of 100 mm/min.

The glass fibre scrim may have a mesh size in the range of from about 0.5 mm×0.5 mm to about 9 mm×9 mm, preferably, the mesh size is from about 2 mm×2 mm to about 8.5 mm×8.5 mm. When the glass fibre scrim has a mesh size of less than about 0.5 mm×0.5 mm, impregnation of the curable composition in the glass fibre scrim is less effective, whereas when the glass fibre scrim has a mesh size of greater than about 9 mm×9 mm, the reinforcement by the glass fibre scrim is less effective, and the resulting barrier is less robust. Furthermore, cracks may appear in the cured phosphate composition in a fire which may lead to exposure of an underlying substrate to the flames.

The glass fibre scrim may have a weight of from about 40 to about 400 g/m$^2$, suitably, the glass fibre scrim has a weight of from about 60 to about 220 g/m$^2$.

Suitably, the barrier has a thickness of from about 1 mm to about 10 mm, preferably from about 1.5 mm to about 5 mm, such as from about 2 mm to about 4 mm. When the barrier is less than about 1 mm thick, the fire retardancy imparted by it is less effective. When the barrier is greater than about 10 mm, the weight of the barrier may significantly increase the weight of the underlying substrate to which it is attached/adhered. Advantageously, an effective a thickness of from about 1.5 mm to about 5 mm imparts significant fire retardancy properties to a structural element to which it is adhered.

A barrier having a thickness of about 1 mm has a weight of from about 1.3 to about 1.5 kg/m$^2$.

The barrier of the present invention may be applied to a wide variety of structural elements, to form fire-resistant construction articles. The barrier of the present invention is particularly suitable for improving the fire performance of foam, such as thermoset or thermoplastic foam.

Preferred embodiments of the present invention include construction articles comprising thermal insulating foams having the barrier of the present invention applied i.e. adhered thereto. For example, in one particularly preferred embodiment the present invention provides a construction article comprising polystyrene foam having a barrier of the present invention adhered thereto. In another particularly preferred embodiment the present invention provides a construction article comprising a phenolic foam having a barrier of the present invention adhered thereto. In yet a further preferred embodiment the present invention provides a construction article comprising a polyurethane foam having a barrier of the present invention adhered thereto, or a construction article comprising a polyisocyanurate foam having a barrier of the present invention adhered thereto.

Suitably, the construction article may be a roof element, a wall element, or a floor element.

The thermal insulating foams suitably have a density in the range of from about 10 kg/m$^3$ to about 150 kg/m$^3$, more suitably from about 10 kg/m$^3$ to about 100 kg/m$^3$, such as from about 10 kg/m$^3$ to 60 kg/m$^3$. The thermal insulating foams suitably have a compressive strength of from about 5 to about 500 kPa, preferably of from about 15 to about 200 kPa. The thermal insulating foams suitably, have a thermal conductivity of from about 0.0150 W/m·K to about 0.040 W/m·K. Preferably the thermal conductivity is 0.036 W/m·K or less, such as 0.032 W/m·K or less, for example, 0.025 W/m·K or less, such as 0.022 W/m·K or less.

When the structural element is expanded polystyrene (EPS) foam or extruded polystyrene (XPS) foam the density of the foam may be from about 10 kg/m$^3$ to about 35 kg/m$^3$, preferably from about 15 kg/m$^3$ to about 25 kg/m$^3$, the compressive strength may be from about 5 to about 500 kPa, preferably from about 40 to about 200 kPa, and the thermal conductivity may be from about 0.040 to 0.030 W/m·K. Suitable EPS foams are commercially available from Kingspan under the tradename Unidek EPS or Aeroboard®. Suitable, XPS foams are commercially available from Kingspan under the tradename Styrozone®.

When the structural element is a polyurethane foam or polyisocyanurate foam the density of the foam may be from about 10 kg/m$^3$ to 60 kg/m$^3$, preferably from about 25 kg/m$^3$ to 35 kg/m$^3$ the compressive strength may be from about 50 to 300 kPa, preferably from 100 to 200 kPa, and the thermal conductivity is from about 0.020 to 0.026 W/m·K. Suitable polyisocyanurate foams are commercially available from Kingspan under the tradename Therma™.

When the structural element is a phenolic foam the density of the foam may be from about 10 kg/m³ to about 100 kg/m³, suitably, from about 20 kg/m³ to about 60 kg/m³, more suitably, from about 25 kg/m³ to about 45 kg/m³, the compressive strength may be from about 50 to 300 kPa, preferably from 80 to 150 kPa, and the thermal conductivity is from about 0.015 W/m·K to 0.0250 W/m·K. Such phenolic foams are commercially available from Kingspan under the tradename Kooltherm®.

Suitably, the construction article comprises a structural element having a barrier applied thereto, wherein the barrier has a thickness of from about 1.5 mm to about 5 mm, such as from about 2 mm to about 4 mm.

When the structural element is a construction board, the barrier may be applied to one or more faces thereof. For example, the structural element may be a construction board, which is substantially parallelepiped in shape and having an upper surface and a lower surface, whereby said upper and said lower surfaces are the surfaces having the largest surface area (i.e. the major surfaces of the board). The barrier may for example be applied to one of the upper and lower surfaces or to both the upper and lower surfaces. Moreover, the barrier may be applied to each of the surfaces of the structural element. Furthermore, the barrier may be applied to a composite construction board, for example, the barrier may be applied to a composite construction board comprising a foam core and a reinforcing member, such as an EPS foam board, having a particle board facer, with the barrier of the invention applied to either a major surface of the EPS foam board, or a major surface of the particle board facer.

Advantageously, when the barrier has a thickness of from about 1.5 mm, the resulting construction article has at least a B classification according to EN 13501.

Advantageously, the construction articles comprising the barrier of the present invention are significantly lighter than corresponding construction articles comprising plasterboard (instead of the barrier of the present invention).

Method of Manufacture

FIG. 1 shows a method of manufacturing a construction article comprising a barrier as described herein. Structural elements 101, such as foam boards, are provided on conveyor 102. A curable composition 103 is dispensed from a manifold 104 onto a structural element, to provide a layer of curable composition 103a on a first surface 101a of the structural element. The curable composition is formed from a 2K composition. The component parts of the 2K composition are stored in tanks 105a and 105b. The component parts of the 2K composition are conveyed from tanks 105a and 105b to mixing chamber 106. A scrim 107 is fed from a roll 108 and applied to a layer of curable composition on a first surface of the structural element. Rollers 109 press the glass fibre scrim into the curable composition and thereby form a coating comprising the glass fibre scrim embedded in the curable composition on said first surface and wherein the curable composition is impregnated in the glass fibre scrim. The structural element having the coating comprising the curable composition and scrim applied thereto is subsequently cured to form a construction article 110 comprising a barrier 111 adhered to the structural element. The construction article may then be cut to size by saw 112.

Figure 2:
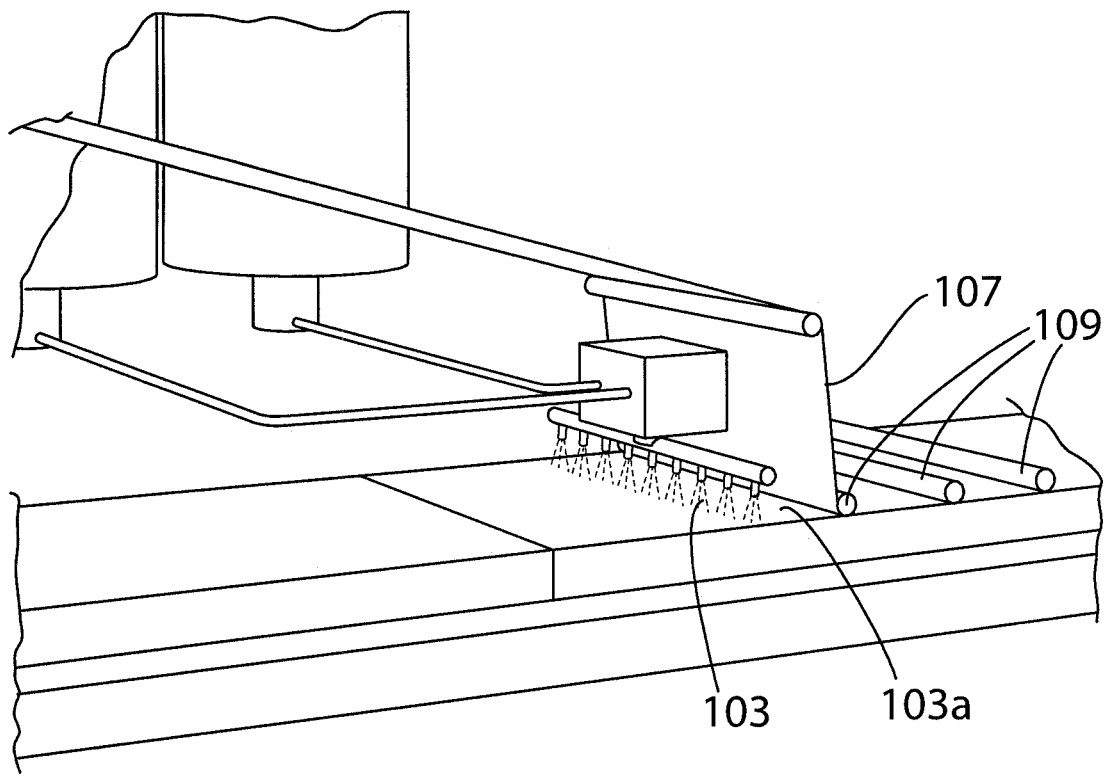
FIG. 2 shows the application of the curable composition onto a foam board.

FIG. 2 shows direct application of the curable composition 103 onto a first surface 101a of the structural element 101 to provide a layer of curable composition 103a on the first surface of the structural element. The glass fibre scrim 107 is subsequently applied to the first surface 101a of the structural element 101 and pressed by rollers 109 into the layer of curable composition 103a to embed the glass fibre scrim in the layer of coating and impregnate the curable composition in the glass fibre scrim. The resulting coating comprising the glass fibre scrim embedded in the curable composition with the curable composition impregnating the glass fibre scrim, is subsequently cured to form the construction article 110 which comprises a barrier 111 adhered to the first surface 101a of the structural element 101.

Figure 3:
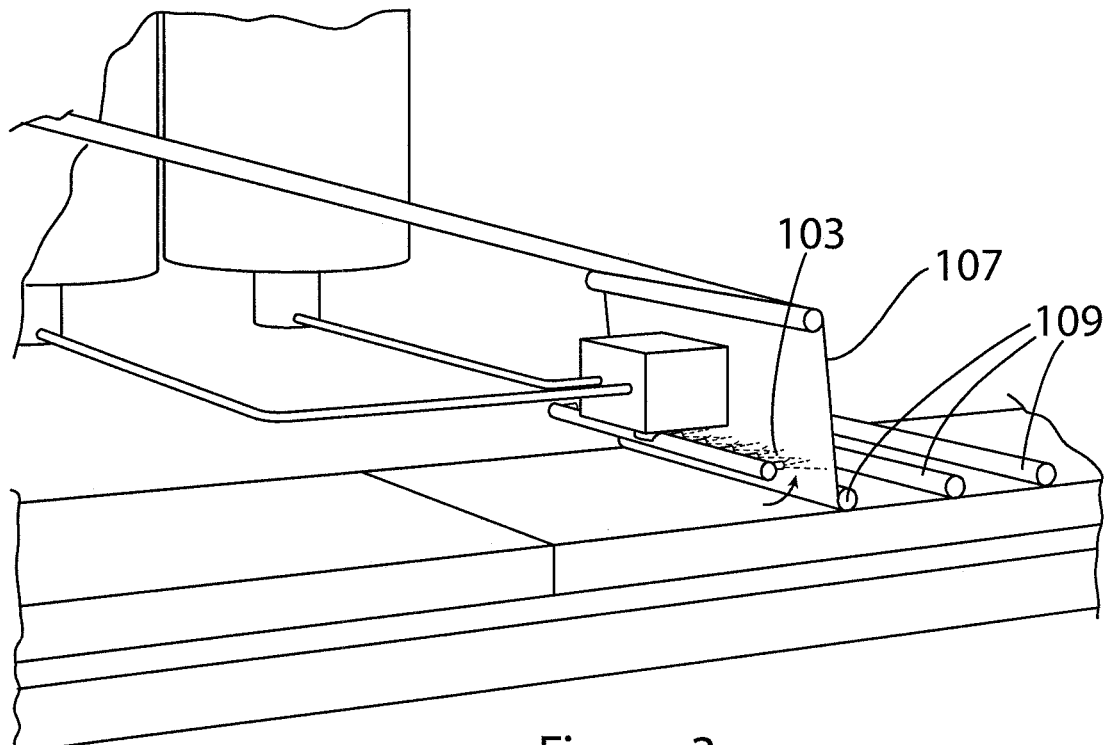
FIG. 3 shows the application of the curable composition onto the glass fibre scrim prior to pressing the glass fibre scrim and curable composition onto the foam board.

FIG. 3 shows direct application of the curable composition 103 to the glass fibre scrim 107. The resulting scrim and composition are pressed onto a first surface of the structural element 101a to thereby form the coating comprising the glass fibre scrim embedded in the curable composition and to impregnate the curable composition in said scrim. The curable composition is then cured to form the construction article 110 which comprises a barrier 111 adhered to the first surface 101a of the structural element 101.

While the method in FIGS. 1 to 3 shows the barrier being applied on the upper surface of EPS boards, the barrier may also for example be applied to the lower surface thereof. Furthermore, while FIGS. 1 to 3 show the application of the curable composition via a single manifold, additional manifolds may be utilised to apply additional coatings of curable composition for example after the first roller 109 (not shown), additional rollers 109 may be included on the line after each additional manifold, to ensure a flat and smooth surface coating.

Phosphate Compositions

Suitable curable phosphate compositions are described in U.S. Pat. No. 7,429,290.

Two-part curable compositions as provided below were employed:

| Part A | Wt % of Part A | Part B | Wt % of Part B |
|---|---|---|---|
| MKP | 45-60 | MgO | 35-55 |
| Aluminium silicate | 10-20 | silica | 10-20 |
| Silica | 0.5-5 | water | 15-45 |
| Water | 15-45 | | |
| Isopropyl Alcohol | 0.01-1 | | |

Each part of the 2K composition is mixed in a 1:1 ratio by volume. The 2K composition may be applied by brush, roller or spray. Preferably, the 2K composition is applied by spraying, to ensure an even coating.

The curable phosphate composition may be applied at a temperature of from about 5° C. to about 40° C., suitably, the curable phosphate composition is applied at a temperature of about 20° C. to about 30° C., preferably the curable phosphate composition is applied at a temperature of about 24° C. to about 28° C., such as at about 25° C.

The curable phosphate composition may be cured by allowing to stand at room temperature. For example, the curable phosphate composition may be cured by allowing to stand at room temperature for 30 minutes to 180 minutes. When allowed to stand at 20° C., the curable compositions cured to be touch dry after 15 minutes.

Scrims

A wide variety of glass fibre scrims were assessed in order to determine the most suitable type of glass fibre scrim for the barrier of the invention. The hydrophilicity of each scrim was qualitatively assessed by pouring water on the glass fibre scrim and observing the glass fibre scrim using a microscope. Scrims where droplets were formed on the surface were characterised as hydrophobic. Such scrims proved ineffective in the barrier of the present invention. Scrims where the water formed a film in and around the glass fibre scrim were selected for further investigation. In total a panel of 45 scrims was assessed.

Figure 4:
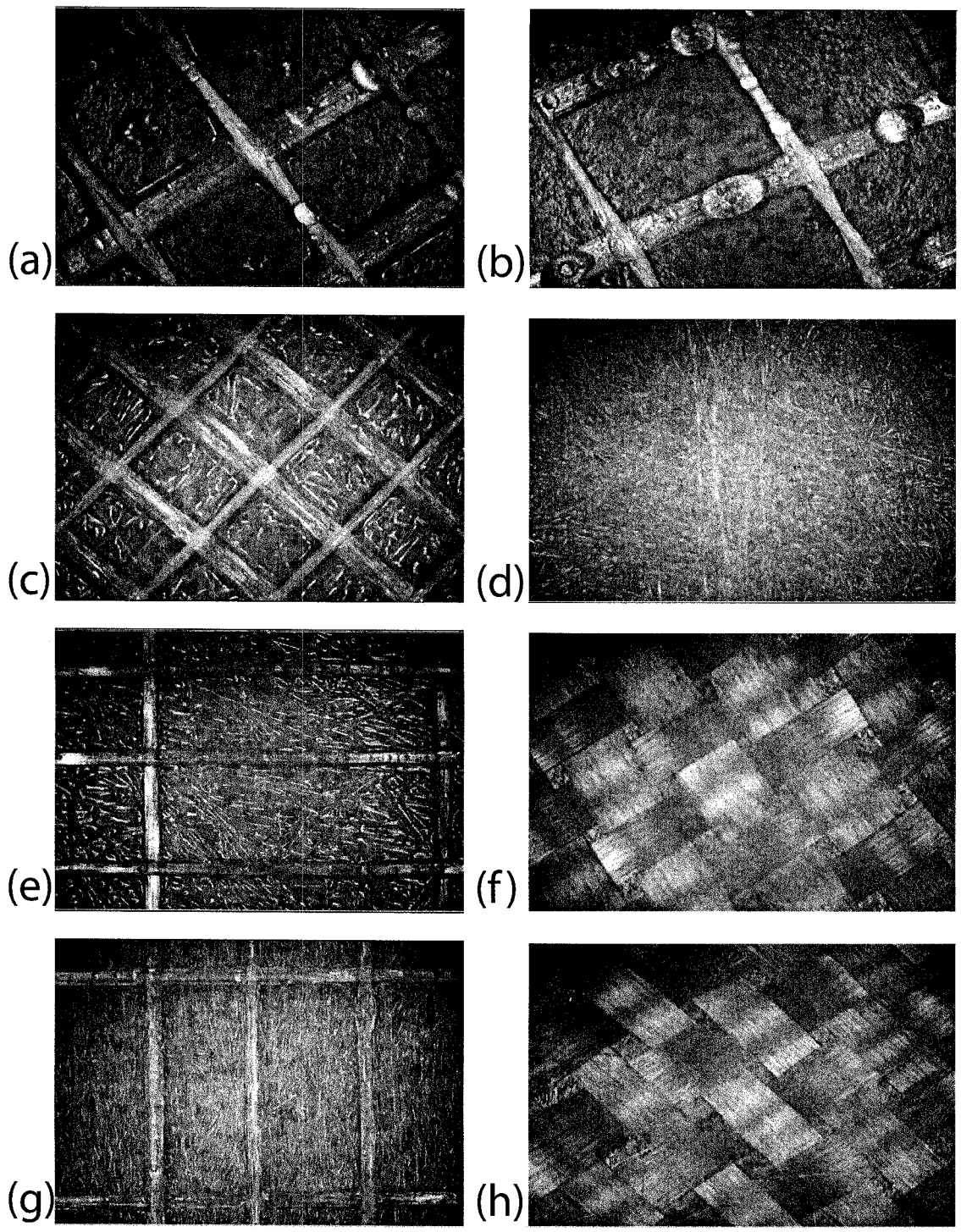
FIG. 4 shows a variety of scrims which were assessed.

FIG. 4 shows microscope images of a selection of scrims which were tested. FIG. 4a and FIG. 4b show scrims where droplets formed on the surface thereof, having had water poured thereon and which were therefore characterised as hydrophobic. The glass fibre scrims in FIGS. 4c to 4h did not repel water and were therefore progressed for further testing.

The glass fibre scrims of FIGS. 4c to 4h were assessed to determine their ability to modify the pH of demineralised water having a pH of 7, in accordance with ISO 3071:2005. The results are presented in Table 1.

TABLE 1

| Sample | Scrim shown in FIG. 1 | Weight (g/m²) of scrim | pH of aqueous extract* | Reaction to fire according to EN13501 of EPS with barrier** adhered thereto |
|---|---|---|---|---|
| 1 | 4c | 93 | 6.73 | E |
| 2 | 4d | 133 | 6.57 | E |
| 3 | 4e | 195 | 5.67 | B |
| 4 | 4f | 109 | 5.88 | B |
| 5 | 4g | 197 | 5.67 | B |
| 6 | 4h | 111 | 5.88 | B |

*Effect of scrim on pH of demineralised water having a pH of 7, was measured in duplicate.
**Barrier is formed from cured 2K curable phosphate composition and specified scrim Each of the glass fibre scrims which passed the initial qualitative hydrophilicity assessment were employed to reinforce phosphate compositions and form fire-resistant barriers on expanded polystyrene (EPS) foam boards.

The foam boards had a density of 15 to 20 Kg/m³, a compressive strength of about 60 to 100 kPa, and a thermal conductivity of about 0.031 W/m·K.

Barriers formed from a cured phosphate composition and scrims capable of reducing the pH of demineralised water having a pH of 7 to a pH 6.3 or lower, when assessed in accordance with ISO 3071:2005, demonstrated excellent fire performance—samples 3 to 6 in Table 1. These scrims were sufficiently hydrophilic to be impregnated by the curable phosphate composition, and the barriers formed therewith were significantly more robust than barriers formed from hydrophobic scrims, or scrims not capable of reducing the pH of demineralised water having a pH of 7 to a pH 6.3 or lower, when assessed in accordance with ISO 3071:2005.

EPS boards are class E materials according to EN13501. When EPS boards had the barrier according to the present invention adhered thereto, the fire performance of the resulting construction articles was greatly improved, each article according to the present invention achieving class B.

A comparative experiment was conducted whereby EPS boards were coated with the curable phosphate composition without a scrim. A construction article comprising a structural element comprising an EPS board having a barrier consisting of a cured phosphate composition applied to the EPS board was provided. The reaction to fire of the construction article was assessed in accordance with EN13501. During EN13501 testing the performance of a specimen in a single burning item test is evaluated for a period of 20 minutes. While the cured phosphate composition enhanced the fire performance of the EPS initially, cracks appear in the cured phosphate coating prior to the completion of the test and once this occurs the EPS is exposed to the flame and ignites, leading to failure of the single burning item test.

Barriers formed from a cured phosphate composition and glass fibre scrims which were not capable of reducing the pH of demineralised water having a pH of 7 to a pH of 6.3 or less when assessed in accordance with ISO 3071:2005, have reduced tensile strengths in delamination tests according to EN1607 in comparison to barriers according to the present invention. In addition, barriers formed using scrims other than those specified in the present invention cracked during assessment of the fire performance of said barriers in accordance with EN13501.

Interestingly, when the barriers were formed on EPS using an adhesion promoter, such as isopropyl alcohol, the tensile strength of the barrier in a delamination test according to EN1607 was significantly greater than without the use of an adhesion promoter. For example, the tensile strength of the barrier perpendicular to the face of the EPS board was approximately 80 to 100 kPa when measured in accordance with EN1607, whereas without the addition of an adhesion promoter the tensile strength was approximately 20 to 40 kPa when measured in accordance with EN1607. Furthermore, when the tensile strength of a barrier of the invention perpendicular to the face of an EPS board wherein said EPS board was pre-treated with an adhesion promoter comprising an acrylic-styrene co-polymer, specifically an emulsion comprising an acrylic-styrene co-polymer in water, was measured in accordance with EN1607, the tensile strength increased to the point of substrate failure of the EPS, such that the tensile strength was in the range of 100 kPa to 150 kPa.

Figure 5A:
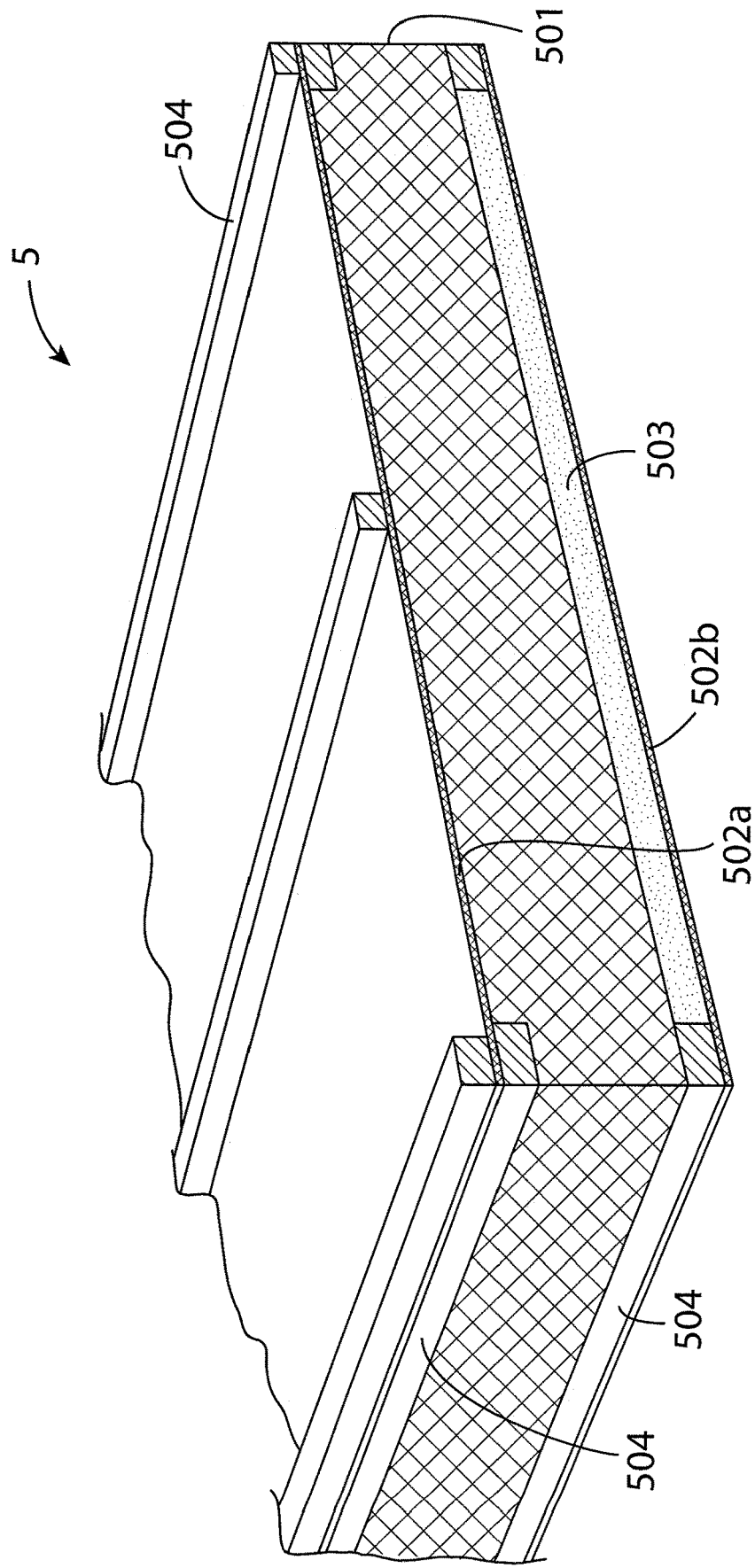
FIG. 5a shows a roof element comprising a thermal insulating foam and a layer of gypsum sandwiched between two particle boards.

FIG. 5a shows a prior art composite roof element 5, comprising an insulating foam core 501 and a layer of gypsum 503 sandwiched between two particle boards 502a & 502b. The roof element shown in FIG. 5a also comprises timber laths 504 through which securing means such as screws or bolts may be provided to secure the roof element 5 to supporting joists, such as purlins or a wall plate (not shown).

The layer of gypsum 503 is employed as a fire resistant barrier in the composite roof element 5. The gypsum layer 503 is approximately 12 mm and weighs approximately 9-10 kg/m². Advantageously, composite roof elements such as that shown in FIG. 5 may be employed in the manufacture of roofs, without the need for rafters. The gypsum layer and particle board provide structural support to the insulating foam core. Such composite roof elements comprising an EPS foam layer have a class C fire performance, as a consequence of the fire resistance imparted by the gypsum layer.

Figure 6A:
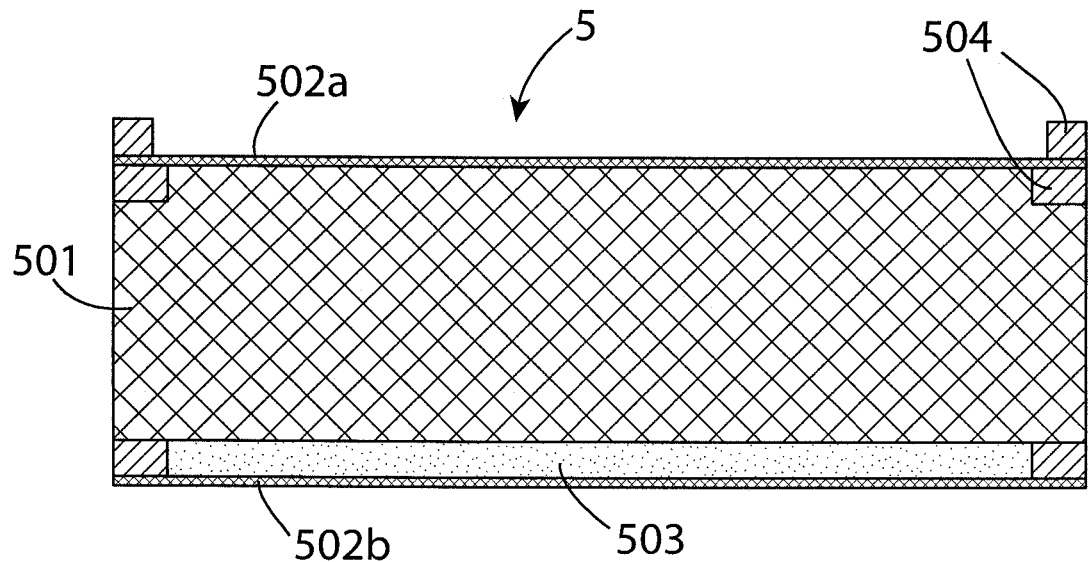
FIG. 6a shows a cross-section view of the composite roof element of FIG. 5a and FIG. 6b shows a cross-section view of the construction article of the present invention shown in FIG. 5b.

A cross section of the roof element 5 is shown in FIG. 6a.

Figure 5B:
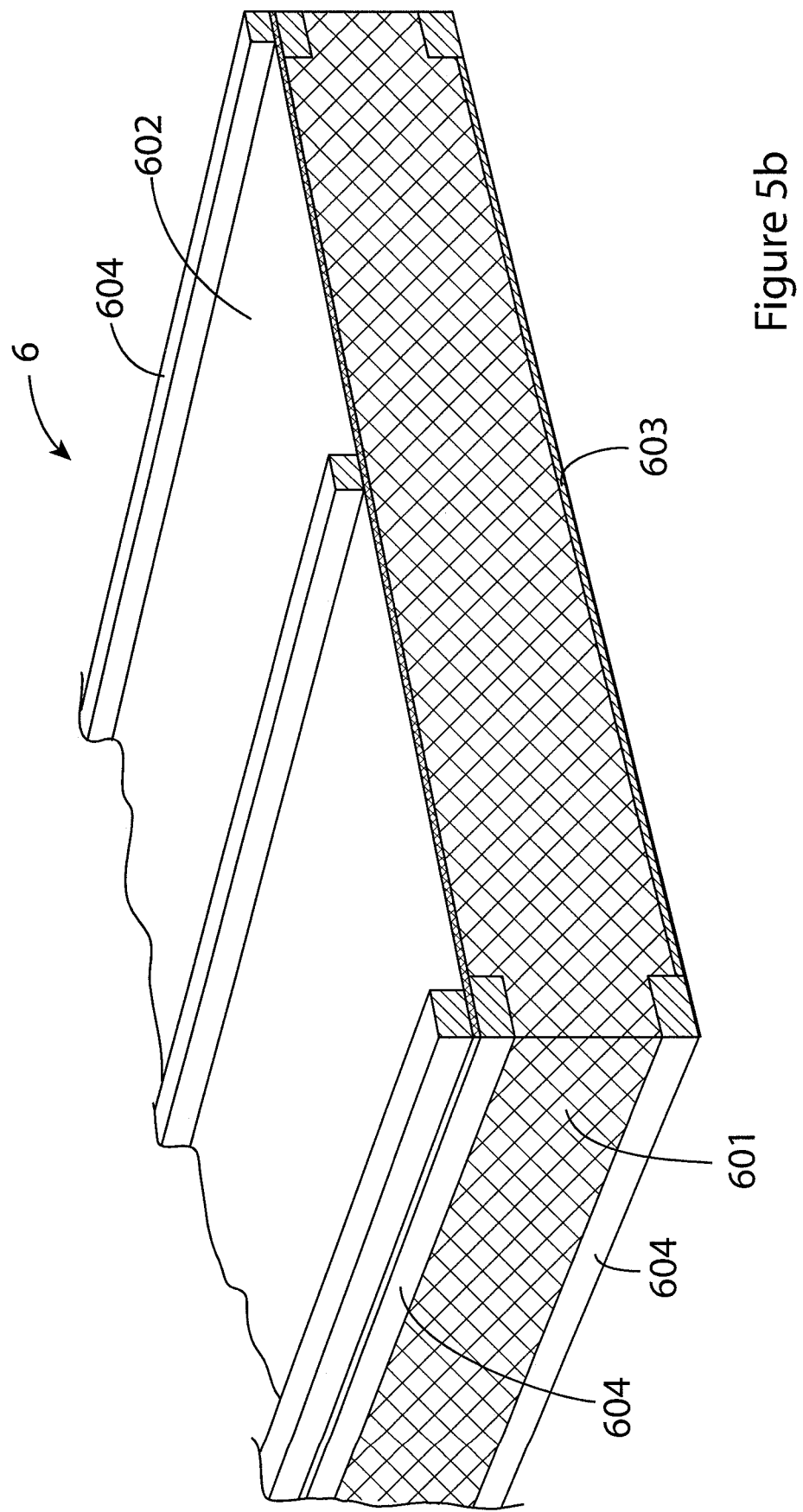
FIG. 5b shows a construction article according to the present invention.

FIG. 5b shows a construction article 6 according to the present invention.

Figure 6B:
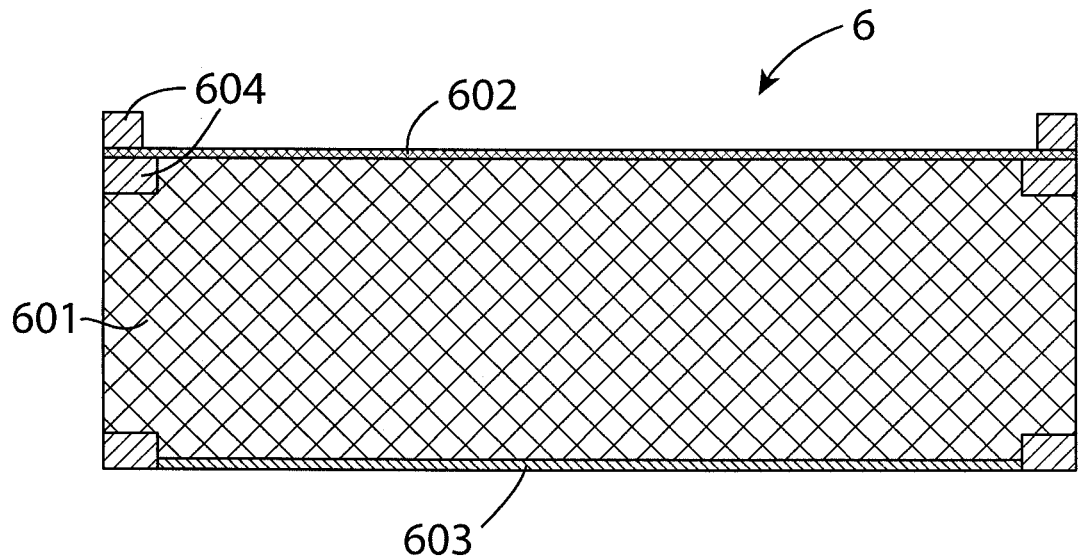

FIG. 6b shows a cross-section of a further embodiment of the present invention. The construction article 6 comprises an insulating foam structural element 601, to which the barrier 603 of the present invention is applied. The insulating foam structural element 601 also has a layer of particle board 602 attached thereto. The construction article also comprises laths 604 through which securing means such as screws or bolts may be provided to secure the construction article 6 to supporting joists, such as purlins or a wall plate (not shown). Advantageously, the scrim in the barrier layer provides sufficient reinforcement to the cured phosphate composition and the insulating foam structural element that the need for a second layer of particle board is removed. Furthermore, the barrier is significantly lighter than the gypsum layer of conventional roof elements such as that shown in FIG. 5a, and therefore, the construction article of the present invention, may be employed to replace roof elements such that in FIG. 5a, with the additional benefit of an improvement in fire performance and a reduction in weight, while maintaining the ability to span the same distances as conventional roof elements. Moreover, as the enhanced fire performance can be achieved by utilising a barrier layer having a thickness of from about 1.5 mm, the construction article takes up less space than conventional construction articles.

A preferred construction article of the present invention comprises an EPS structural element having the barrier of the invention applied thereto, wherein the barrier is provided on an inner surface of the EPS structural element and wherein a facer such as a facer formed from particle board, OSB board, fibreboard or plywood board is provided on an outer surface of the EPS. Such a construction article is particularly useful as a roof element, whereby the article is oriented such that the barrier faces the interior of the building and the facer on the outer surface of the EPS is towards the exterior of the building.

For example, a prior art construction article comprising a sandwich element having two 3 mm particle board facers and an EPS structural element having a thickness of 80 mm and having a length of 2 m, may be replaced with a construction article according to the present invention comprising an EPS structural element having a thickness of 80 mm and having the barrier of the invention applied thereto, wherein the barrier is provided on an inner surface of the EPS structural element, and wherein the barrier has a thickness of about 1.5 mm and wherein a facer such as a particle board is provided on the outer surface of the EPS. Advantageously, the barrier of the present invention provides sufficient reinforcement to replace for example a 3 mm thick particle board. This further improves the fire performance of the construction articles of the present invention over prior art construction articles. Furthermore, this improvement can be achieved without necessitating any reduction in span of the construction article in comparison to the prior art construction article. The construction articles of the present invention may be up to 10 m in length, suitably, 2 m to 8 m in length.

Similarly, a prior art construction article comprising a sandwich element having two 3 mm particle board facers and an EPS structural element having a thickness of 200 mm and having a length of 3.6 m, may be replaced with a construction article according to the present invention comprising an EPS structural element having a thickness of 200 mm and having the barrier of the invention applied thereto, wherein the barrier is provided on an inner surface of the EPS structural element, and wherein the barrier has a thickness of about 1.5 mm and wherein a facer such as a particle board is provided on the outer surface of the EPS. Advantageously, the barrier of the present invention provides sufficient reinforcement to replace for example a 3 mm thick particle board facer.

The person skilled in the art will appreciate that depending on the U-value required for a particular application, the thickness of a foam structural element in the construction articles according to the present invention, can be chosen accordingly.

Figure 7:
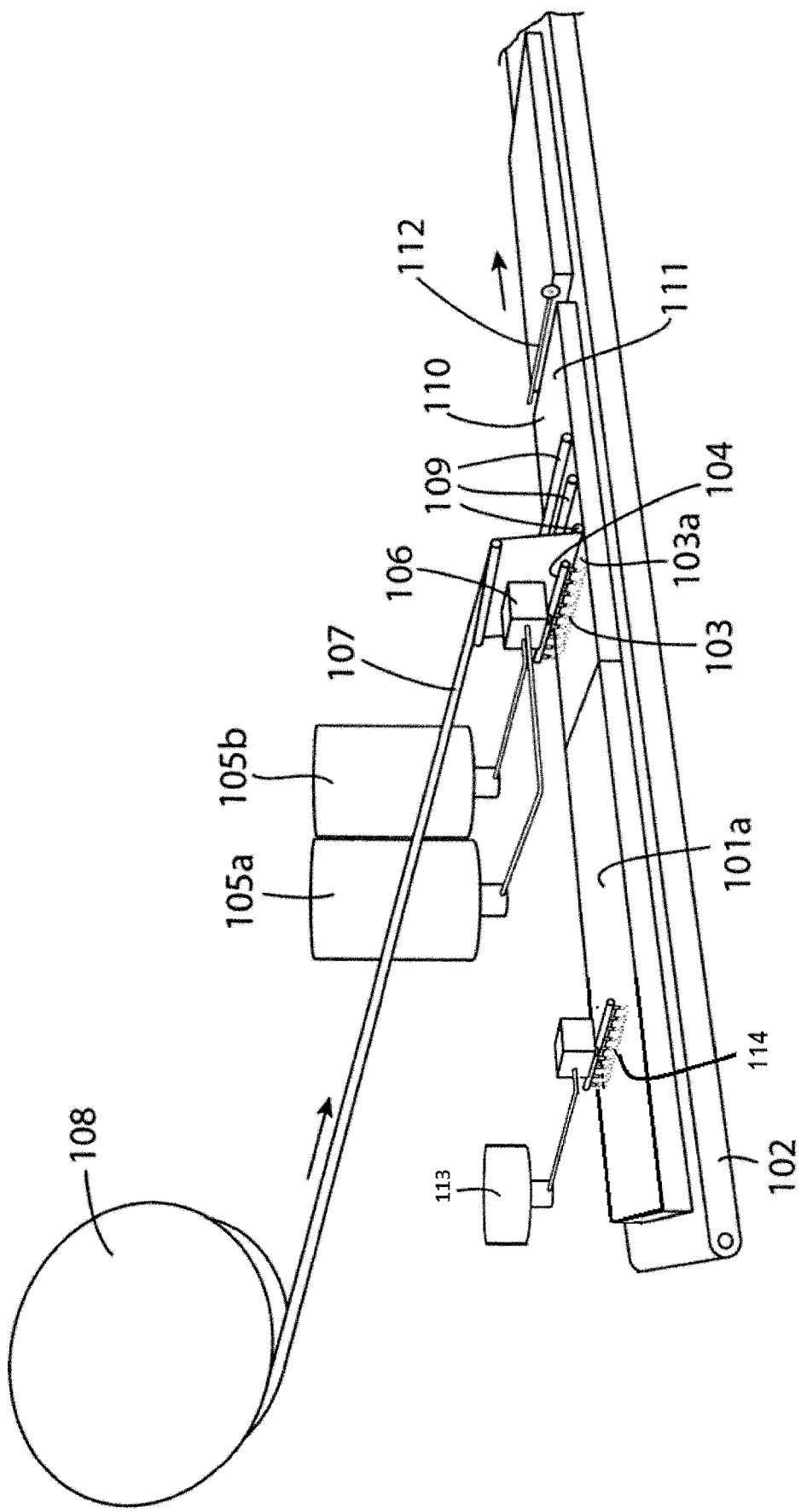
FIG. 7 shows the method of manufacture of a construction article comprising a barrier as described herein, wherein an adhesion promoter is applied to the structural element prior to application of the curable composition and the glass fibre scrim onto the foam board.

A preferred method for manufacturing a construction article of the present invention is shown in FIG. 7. The method is a continuous process. The structural elements 101, suitably EPS foam boards are provided on conveyor 102. Reservoir 113 comprises an adhesion promoter, preferably an emulsion comprising an acrylic-styrene co-polymer and water, which is fed through conduits and a manifold to spray heads from which the structural elements 101 are sprayed with the adhesion promoter 114. A suitable source of an acrylic-styrenic co-polymer adhesion promoter is available from Impershield under the trade name Bio-Seal Euroflex, which comprises an emulsion comprising an acrylic-styrenic co-polymer in water, wherein the co-polymer is present in about 50 wt % based on the total weight of the emulsion. Suitably, the Bio-Seal Euroflex is diluted further with water, to provide an emulsion comprising an acrylic-styrenic co-polymer in an amount of from about 2 wt % to about 20 wt % based on the total weight of the emulsion, preferably in an amount of from about 8 wt % to about 14 wt % of acrylic-styrenic co-polymer based on the total weight of the emulsion.

The adhesion promoter may be sprayed directly onto a first surface of a structural element such as an EPS foam board, followed directly by application of the curable composition, suitably a 2K composition.

Suitably, the curable composition comprises mono potassium phosphate in an amount of from about 24 to about 32 weight percent, magnesium oxide in an amount of from about 22 to 28 weight percent, aluminium silicate or calcium silicate in an amount of from about 2 to 5 weight percent, water in an amount of from about 20 to 40 weight percent, and an isopropanol present in an amount of from about 0.01 to about 2 weight percent, based on the total weight of the curable composition.

The curable composition is suitably applied to the structural element (e.g. an EPS foam board) by spraying onto the pre-treated first surface of the structural element (e.g. an EPS foam board pre-treated with an adhesion promoter comprising an acrylic-styrenic co-polymer). As shown in FIG. 7, the component parts of a 2K curable composition are conveyed from tanks 105a and 105b to mixing chamber 106.

The scrim 107 is fed from roll 108 and applied to a layer of curable composition on said first surface of the structural element (which has already been pre-treated with adhesion promoter). Rollers 109 press the glass fibre scrim into the curable composition and thereby form a coating comprising the glass fibre scrim embedded in the curable composition on said first surface and wherein the curable composition is impregnated in the glass fibre scrim.

The glass fibre scrims suitable for use in the present invention are capable of lowering the pH of demineralised water from pH 7 to pH 6.3 or lower, when assessed in accordance with ISO 3071:2005. Such scrims are commercially available from Dr Gunster kast GmbH, for example IN/S 060 and IN 3468 and also from Changzhou Pro-tech industry co. LTD, for example Protech 200.

The structural element (e.g. EPS foam board) having the coating comprising the curable composition and the scrim applied thereto is subsequently cured to form a construction article 110 comprising a barrier 111 adhered to said structural element.

In a preferred embodiment, the structural element is an EPS foam board, the adhesion promoter comprises an acrylic-styrenic co-polymer which is used to pre-treat the EPS foam board prior to application of the curable composition thereto. The curable composition comprises mono potassium phosphate in an amount of from about 24 to about 32 weight percent, magnesium oxide in an amount of from about 22 to 28 weight percent, aluminium silicate or calcium silicate in an amount of from about 2 to 5 weight percent, water in an amount of from about 20 to 40 weight percent, and isopropanol present in an amount of from about 0.01 to about 2 weight percent, based on the total weight of the curable composition, and the glass fibre scrim has a weight in the range of from 150 g/m² to 220 g/m². The barrier suitably has a thickness of from about 2 mm to 4 mm, and a weight of about 1.3 kg/m² to 1.5 kg/m².

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A barrier comprising a cured phosphate composition and a glass fibre scrim, wherein the cured phosphate composition is impregnated within the glass fibre scrim and further wherein the glass fibre scrim has a mesh size in the range of from 0.5 mm×0.5 mm to 9 mm×9 mm and further wherein the glass fibre scrim is capable of reducing the pH of demineralised water having a pH of 7 to a pH 6.3 or lower, when assessed in accordance with ISO 3071:2005, said barrier having a thickness of at least 1 mm;
the cured phosphate composition is formed from a curable composition comprising:
a phosphate selected from the group consisting of: phosphoric acid, phosphoric acid salts and combinations thereof,
a metal oxide, a metal silicate, and water,
where the weight ratio between the phosphate and the metal oxide is between about 3:1 and 1:1.

2. The barrier according to claim 1, wherein the phosphate is present in an amount of from about 10 to about 45 weight percent based on the total weight of the curable composition.

3. The barrier according to claim 1, wherein the metal oxide is present in an amount of from about 5 to about 35 weight percent based on the total weight of the curable composition.

4. The barrier according to claim 1, wherein the metal silicate is present in an amount of from about 1 to 15 weight percent based on the total weight of the curable composition.

5. The barrier according to claim 1, wherein the phosphate is mono-potassium phosphate.

6. The barrier according to claim 1, wherein the metal oxide is magnesium oxide.

7. The barrier according to claim 1, wherein the curable composition comprises mono potassium phosphate in an amount of from about 24 to about 32 weight percent, magnesium oxide in an amount of from about 22 to 28 weight percent, aluminium silicate or calcium silicate in an amount of from about 2 to 5 weight percent, and water in an amount of from about 20 to 40 weight percent, based on the total weight of the curable composition.

8. The barrier according to claim 1, wherein the curable composition is a two-part (2K) composition.

9. The barrier according to claim 1, wherein the curable composition further comprises an adhesion promoter.

10. The barrier according to claim 9, wherein the adhesion promoter is present in an amount of from about 0.01 wt % to about 5 wt % based on the total weight of the curable composition.

11. The barrier according to claim 9, wherein the adhesion promoter is selected from isopropanol, limonene, sodium silicate, acrylic-styrenic co-polymer or combinations thereof.

12. The barrier according to claim 1, having a thickness of about 1 mm and a weight of about 1.3 to about 1.5 kg/m².

13. A construction article comprising a structural element having a barrier according to claim 1 applied thereto.

14. The construction article according to claim 13, wherein the structural element comprises wood, fibreboards, particleboards, medium density fibreboard (MDF), oriented strand board (OSB), gypsum, a vacuum insulation panel and/or foam.

15. The construction article according to claim 13, and having at least a B classification according to EN13501, or having an A2 or an AI classification according to EN13501.

* * * * *